US008046473B2

(12) United States Patent
Piper et al.

(10) Patent No.: US 8,046,473 B2
(45) Date of Patent: *Oct. 25, 2011

(54) MAINTAINING SESSION STATES WITHIN VIRTUAL MACHINE ENVIRONMENTS

(75) Inventors: Scott A. Piper, Bothell, WA (US); Gregory B. Pruett, Raleigh, NC (US); Charles D. Bauman, Sammamish, WA (US); Carlos Santana, Durham, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/941,068

(22) Filed: Nov. 7, 2010

(65) Prior Publication Data
US 2011/0055406 A1 Mar. 3, 2011

Related U.S. Application Data

(63) Continuation of application No. 11/292,774, filed on Dec. 2, 2005, now Pat. No. 7,877,485.

(51) Int. Cl.
G06F 15/16 (2006.01)
(52) U.S. Cl. .................. 709/227; 709/218; 718/100
(58) Field of Classification Search .............. 709/227
See application file for complete search history.

(56) References Cited

U.S. PATENT DOCUMENTS

| 5,027,269 A | 6/1991 | Grant et al. |
| 6,529,937 B1 | 3/2003 | Murphy, Jr. et al. |
| 6,725,289 B1 * | 4/2004 | Waldspurger et al. ............ 710/9 |
| 6,877,095 B1 | 4/2005 | Allen |
| 7,028,149 B2 * | 4/2006 | Grawrock et al. ............ 711/156 |

OTHER PUBLICATIONS

Ricardo A. Baratto et al., "MobiDesk: Mobile Virtual Desktop Computing," MobiCom'04, Sep. 26-Oct. 1, 2004.
Steven Osman et al., "The Design and Implementation of Zap: A System for Migrating Computing Environments," 5th Symp. on Operating Systems Design & Imp., Winter 2002.
Valeria Cardellini et al., "The State of the Art in Locally Distributed Web-Server Systems," ACM Computing Surveys, 34(2):263-311, Jun. 2002.
Paul Barham et al., "Xen and the Art of Virtualization," Proc. SOSP 2003. Bolton Landing, New York, U.S.A. Oct. 19-22, 2003.
International search report issued in related PCT patent application PCT/EP2006/069217, Apr. 13, 2007. "Introducing Microsoft Virtual Server 2005," Nov. 2004, pp. 1-8, p. 19, II. 23-35, pp. 53-57.
"Techrepublic Guider Tour: Terminal Services Manager Under Windows Server 2003," May 17, 2004.
T. Banks et al., "The evolution of CICS/ESA in the Sysplex environment," IBM Systems Journal, vol. 36, No. 2, 1997, pp. 352-360.
Office action in counterpart European Patent Office application 06 830 284.3-1243, office action dated Mar. 3, 2009.
Office action in counterpart Chiense Patent Office application 200680043480.3, office action dated Oct. 18, 2010 (no translation).

* cited by examiner

Primary Examiner — Kevin Bates
Assistant Examiner — Joe Chacko
(74) Attorney, Agent, or Firm — Tom Tyson (57) ABSTRACT

Sessions states within virtual machine (VM) environments are maintained. Each VM environment hosts a guest operating system (OS) and one or more application programs running. The guest OS and the application computer programs of each VM environment constitute a session. A connection broker maintains a state machine as to states of the sessions and permits transitions among the states in response to messages, commands, and internal decisions. Different types of agents may send the messages, and the commands. The states of the sessions may include a pending state and a number of other states. The pending state is an interim state that indicates a session is being transitioned from one of the other states to another of the other states. These other states may include an offline state, an online-down state, an online-up state, a suspended state, an active state, an idle state, a disconnected state, and a failed state.

17 Claims, 4 Drawing Sheets

MAINTAINING SESSION STATES WITHIN VIRTUAL MACHINE ENVIRONMENTS

RELATED PATENT APPLICATIONS

The present patent application is a continuation of the previously filed patent application having the same titled, filed on May 2, 2005, and assigned application Ser. No. 11/292,774.

FIELD OF THE INVENTION

The present invention relates generally to virtual machine environments, in which guest operating systems run within virtual machines, and more particularly to maintaining the states of sessions within such virtual machine environments.

BACKGROUND OF THE INVENTION

Historically, a single computing device ran a single operating system. Each computer user, for instance, was assigned his or her own client computing device, and that computing device ran an operating system in which the user could run application programs as desired. Similarly, a server computing device ran a single operating system that ran application programs.

However, this type of computer architecture has disadvantages. First, it is costly, because each computing device needs a complete assortment of processors, memory, and input/output (I/O) devices to properly function whether it is being utilized or not. Second, the use of this type of architecture can be inefficient. At any given time, a given computing device may not be performing work, and rather is sitting idle, waiting for a task to be performed during times when workloads increase.

Therefore, a technology has been developed in which more than one operating system is capable of running on a single computing device, sharing at least the memory and the processors of the computing device. Such technology is referred to as virtualization. With virtualization, a given computing device has a number of virtual machines (VM's), or VM environments, where a guest operating system is run in each VM or VM environment. Therefore, guest operating systems for multiple computer users can be run simultaneously on a single computing device, such as a single server computing device. When workload demands are high, more VM's can be instantiated and run. When workloads are low, VM's can be suspended.

The guest operating system of a VM typically supports a single, remotely connected user, and on which are run one or more application programs as desired. The guest operating system hosted by a VM, and the application programs running or capable of running thereon, constitute what is referred to as a "session" that is allocatable to an individual user. A user remotely connects to a VM—that is, the user is allocated a session—via a thin-client computing device, which has a minimum of hardware, since most processing is performed by the server computing device running the VM. The end result is, therefore, a virtualized hosted-client approach, as opposed to a physical hosted-client approach, in which each guest operating system runs on its own separate physical computing device, or "machine," instead of on a VM.

The virtualized hosted-client approach is advantageous over a physical hosted-client approach, because less hardware resources are typically needed to support the same number of end users. However, the virtual hosted-client approach introduces a number of complexities that have to be satisfied in order to perform up to expectations. These complexities result from the fact that a given session can be suspended, restarted, and moved to other VM's on the same (or different) computing devices, instead of merely having for each user a single physical computing device, or "machine," that has to be administered.

In particular, the states of all the sessions running on the VM's have to be carefully tracked. For example, a suspended session may have to be assigned to a VM and restarted before it can be allocated to a user. If sessions, and user connections to the sessions, are not maintained properly, then in great likelihood the virtual hosted-client approach will periodically, if not more frequently, fail. That is, the states of the sessions have to be accurately tracked, taking into account their various characteristics, for sessions to be allocated and maintained properly. For this and other reasons, therefore, there is a need for the present invention.

SUMMARY OF THE INVENTION

The present invention relates generally to maintaining sessions states within virtual machine (VM) environments. A computerized system of one embodiment of the invention includes one or more VM environments and a connection broker. Each VM environment hosts a guest operating system (OS) and one or more application programs capable of running on the guest OS. The guest OS and the application computer programs of each VM environment constitute a session allocatable to a user. The connection broker maintains a state machine as to states of the sessions, and permits transitions among the states in response to messages, commands, and internal decisions.

For instance, the system may include one or more thin-client computing devices to receive output from the VM environments and to send input to the VM environments. Furthermore, the guest OS's run connection-broker agents that send the messages to which the connection broker is responsive. The system may further include an external management agent to manage the VM environments, and which sends the commands to which the connection broker is responsive. The internal decisions to which the connection broker is responsive are made within the connection broker itself.

The states of the sessions may include a pending state and a number of other states. The pending state is an interim state that indicates a session is being transitioned from one of the other states to another of the other states. These other states may include an offline state, an online-down state, an online-up state, a suspended state, an active state, an idle state, a disconnected state, and a failed state.

The offline state indicates that a session is unavailable for allocation. The offline state is transitionable to from the online-down state and the online-up state and when the session is initially added or created, and is exited upon removal or destruction of the session. The offline state is transitionable to the online-down state and the online-up state. The online-down state indicates that a session is virtually powered down but available for allocation. The online-down state is transitionable to from the offline state, online-up state, and the failed state, and transitionable to the offline state and the online-up state.

The online-up state indicates that a session is virtually powered up and available for allocation. The online-up state is transitionable to from the offline state, the online-down state, and the suspended state, and is transitionable to the offline state, the online-down state, the suspended state, and the failed state. The suspended state indicates that a session is running within one of the VM environments that has been suspended, and that the session has not been allocated. The suspended state is transitionable to from the online-up state and from itself, and is transitionable to the online-up state and to itself.

The active state indicates that a session has been allocated to a user who has logged onto the guest OS of the session and is actively using the session. The active state is transitionable to from the online-up state and the disconnected state, and is transitionable to the online-up state, the idle state, and the disconnected state. The idle state indicates that a session has been allocated to a user who has logged onto the guest OS of the session but is running within one of the VM environments that has been suspended. The idle state is transitionable to from the active state and from itself, and is transitionable to the disconnected state and to itself.

The disconnected state indicates that a session has been allocated to a user and is running, but the user is not currently logged onto the guest OS of the session. The disconnected state is transitionable to from the active state and the idle state, and is transitionable to the active state and the failed state. The failed state indicates that a session has failed. The failed state is transitionable to from the online-up state and the disconnected state, and is transitionable to the online-down state.

A computing device of an embodiment of the invention includes a connection broker and a state-tracking mechanism implemented by the connection broker. The connection broker provides services in relation to one or more VM environments. Each VM environment hosts a guest OS and one or more application computer programs capable of running on the guest OS. The guest OS and the application computer programs of each VM environment constitute a session allocatable to a user. The state-tracking mechanism maintains a state machine as to states of the sessions and to permit transitions among the states in response to messages, commands, and internal decisions of the command brokers. The states include a pending state and a number of other states. The pending state indicates that a session is being transitioned from one of the other states to another of the other states.

An article of manufacture of an embodiment of the invention includes a tangible computer-readable medium and means in the medium. The means is for maintaining a state machine as to states of sessions and to permit transitions among the states. Each session encompasses a guest operating system OS hosted by a VM environment and one or more application programs capable of running on the guest OS A method of an embodiment of the invention includes a connection broker receiving a message, command, or an internal decision in relation to a first state of a session. The session encompasses a guest OS hosted by a VM environment, as well as one or more application programs capable of running on the guest OS. The connection broker in response transitions the session from the first state to a second state. The first state and the second state are selected from a number of different states. These states include an offline state, an online-down state, an online-up state, a suspended state, an active state, an idle state, a disconnected state, and a failed state. Furthermore, during transition from the first state to the second state, the session is within an interim, pending state.

Embodiments of the invention provide for advantages over the prior art. In particular, the state machine maintained by the connection broker, such as by a state-tracking mechanism thereof, enables the states of virtualized hosted-client sessions to be carefully tracked. Thus, the connection broker dynamically tracks sessions, and is able to take appropriate actions to prepare a session before an end user connects to the session. Operations performed by the connection broker as to the sessions are managed correctly, since the states of the sessions are known at all times. As a result, an overall virtualized hosted-client solution can be enabled. Still other embodiments, aspects, and advantages of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
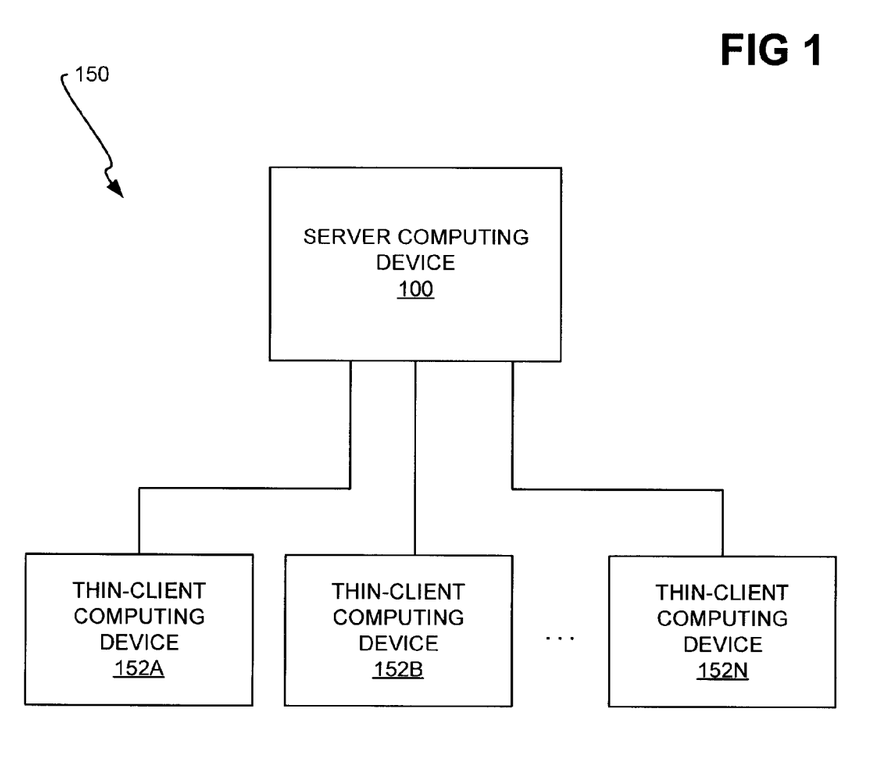
FIG. 1 is a diagram of a computerized system in which a virtualized hosted-client architecture can be implemented, according to an embodiment of the invention.

FIG. 1 shows a system 150 in which a virtualized hosted-client architecture can be implemented, according to an embodiment of the invention. The system 150 includes a server computing device 100 and a number of thin-client computing devices 152A, 152B, . . . , 152N, collectively referred to as the thin-client computing devices 152. While only one server computing device 100 is depicted in FIG. 1, in another embodiment, there may be more than one such server computing device, such that the server computing device 100 as described herein encompasses and subsumes the functionality of all such server computing devices in such an embodiment.

The server computing device 100 is the computing device on which a number of virtual machines (VM's) are implemented, as is described in more detail later in the detailed description. Thus, the server computing device 100 is capable of supporting a number of the thin-client computing devices 152, and thus a number of users. It is noted that a virtualized hosted-client architecture is in distinction to a physical hosted-client architecture. In the latter, each user, and thus each thin-client computing device, is allocated a separate physical computing device, or physical "machine." By comparison, in the former, each user, and thus each thin-client computing device, is not allocated a separate physical computing device, but rather a separate virtual computing device, or virtual "machine" (VM), that runs on the server computing device 100.

Each of the thin-client computing devices 152 desirably in one embodiment has the bare minimum hardware necessary to send user input entered at the thin-client computing device to the server computing device 100, and to display output provided by the server computing device 100 to the user at the thin-client computing device. Therefore, a thin-client computing device may be considered a remote user's computing device, or computer, which performs no application processing itself. Rather, a thin-client computing device functions like an input/output terminal, processing only keyboard, mouse, and other input device input, as well as screen or display output. All application processing is performed at the server computing device 100.

Therefore, the server computing device 100 is communicatively connected to the thin-client computing devices 152. For example, in a typical scenario, the server computing device 100 may be located in a server "closet," to which generally only information technology (IT) personnel of an organization have access. The thin-client computing devices 152, by comparison, are typically located within the cubicles or offices of end users. The thin-client computing devices 152 are thus remote to the server computing device 100, and therefore the end users that use the computing devices 152 are considered remote users.

In addition, a thin-client computing device may in one embodiment include a laptop or other portable or other computer of a user that the user is using to log onto a VM from a remote location. Such a remote location may include the user's home, a hotel where the user is staying for business or pleasure travel, and so on. In such a situation, the computing device may have a full assortment of hardware that can perform desired application processing, but in this instance functions as a thin client in that the server computing device 100 still performs such processing.

Figure 2:
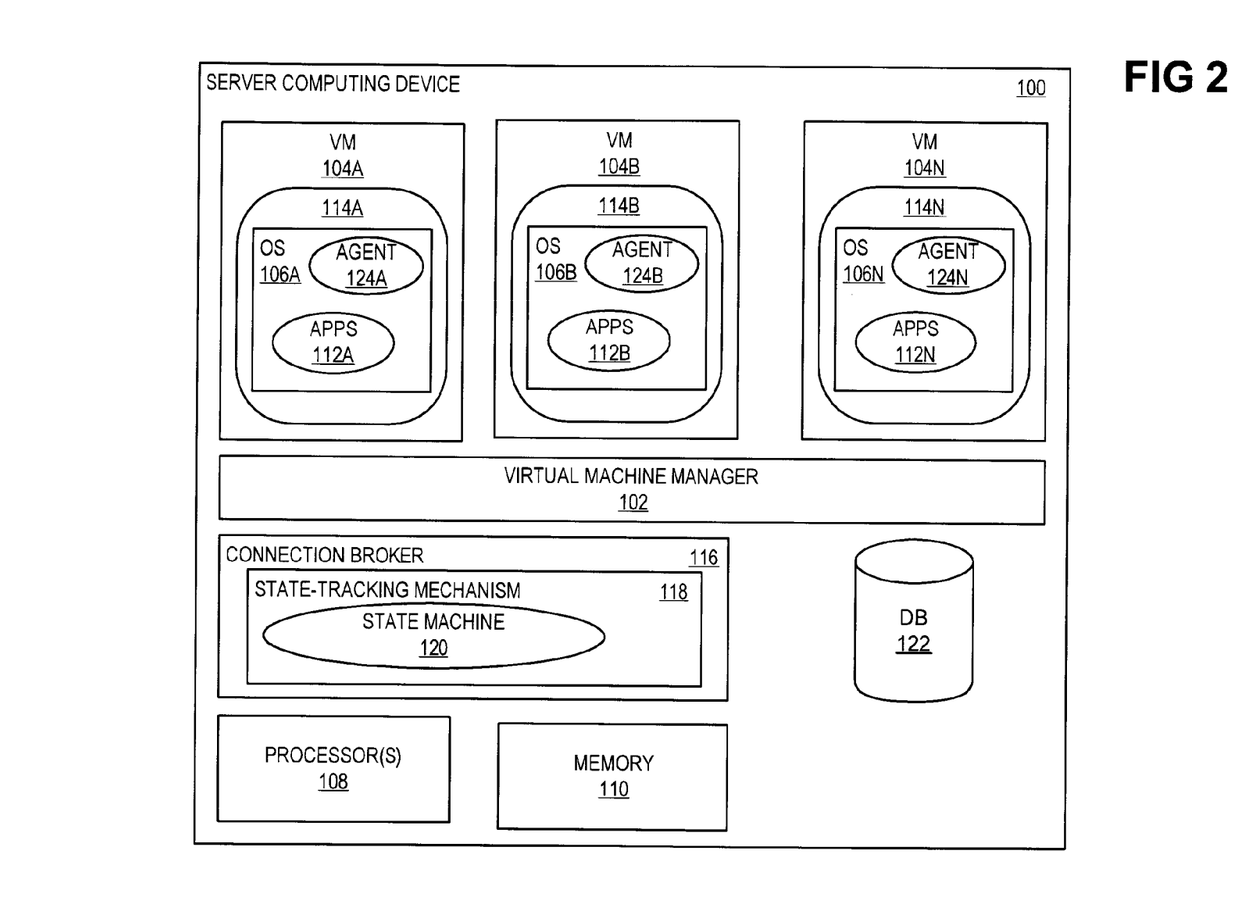
FIG. 2 is a diagram of a server computing device within which a virtual machine (VM) environment is implemented, according to an embodiment of the invention.

FIG. 2 shows the server computing device 100 in more detail, according to an embodiment of the invention. The computing device 100 includes a VM manager (VMM) 102, and a number of VM's 104A, 104B, ..., 104N, collectively referred to as the VM's 104. The VM's 104 may also be referred to as VM environments. The VM's 104 have correspondingly running on them operating systems (OS's) 106A, 106B, ..., 106N, collectively referred to as the OS's 106.

The computing device 100 also includes hardware, such as one or more processors 108, and memory 110. As can be appreciated by those of ordinary skill within the art, the computing device 100 may have other hardware, in addition to and/or in lieu of that depicted in FIG. 2. The memory 110 is shared by the VM's 104. The memory 110 is addressable by a physical address space, having a range of physical memory addresses. Each of the VM's 104 may be assigned a section of the physical address space, such that each of the VM's 104 has assigned thereto a portion of the physical memory addresses of the memory 110. The processors 108 may be shared by the VM's 104, or each of the processors 108 may be utilized by a single one of the VM's 104. In one embodiment, the processors 108 are x86 processors.

Each of the VM's 104 is a virtualized software environment that enables a corresponding one of the OS's 106 to run on it as if the OS in question were the only OS running on the computing device 100. In this way, a number of OS's 106 can run on the computing device 100, within a number of VM's 104. That is, the VM's 104 are VM environments in that each of the VM's 104 appears to software running within the VM's 104 as a traditional hardware environment, such as the sole hardware environment of the computing device 100.

There are a number of application computer programs 112A, 112B, ..., 112N, collectively referred to as the application computer programs 112, that are running on or capable of running on the OS's 106 of the VM's 104. These application computer programs 112 may be word-processing programs, spreadsheet programs, presentation programs, e-mail programs, web-browsing programs, as well as other types of application computer programs. The set of application computer programs and the OS of a given VM are referred to as a session. For example, a session 114A encompasses the OS 106A and the application computer programs 112A. In general, there are sessions 114A, 114B, ..., 114N, encompassing the OS's 106 and the application computer programs 112.

A given session is not necessarily tied to a given VM, such that the depiction of the sessions 114 corresponding to the VM's 104 in FIG. 2 does not mean that these individual sessions are only capable of running on their individual VM's as indicated in FIG. 2. Therefore, sessions can be moved among VM's as desired or needed. Sessions can be instantiated, or created, and destroyed, or deleted, as needed. VM's likewise can be instantiated and destroyed as needed. There may be a number of VM's 104 initially created, for instance, such that as needed a session is created and assigned to one of these VM's 104.

The VM manager 102 is software that allows a user, such as information technology (IT) personnel like a network administrator, to manage the VM's 104. That is, the VM manager 102 allows for such users to administer the individual VM's 104, such as their startup, shutdown and maintenance. The VM manager 102 is more generally an external management agent, in that it is external to the VM's 104. Although the VM manager 102 is depicted in FIG. 2 as being run on the same server computing device 100 as the VM's 104, it may be run on a different computing device in another embodiment of the invention. When an administrator or other user decides that a new VM should be started, he or she starts it from within the VM manager 102, and when this user decides to shutdown an existing VM, he or she shuts it down from within the VM manager 102. The VM manager 102 is also commonly referred to as a hypervisor.

The computing device 100 also includes a connection broker 116 that is software which provides services in relation to the VM's 104 and the sessions 114. These services include arbitrating the number of end, or remote, user connections, suspending idle sessions, restarting failed or hung VM's, and moving VM's among physical computing devices, where there is more than one server computing device. Thus, the connection broker 116 has direct control over the VM's 104 and the sessions 114. By comparison, the VM manager 102 communicates with the connection broker 116 in order to manage the VM's 104 via commands to which the connection broker 116 is responsive.

The connection broker 116 implements a state-tracking mechanism 118, which is also software. The state-tracking mechanism 118 maintains a state machine 120 of the states that the sessions 114 are currently in, as is described in more detail later in the detailed description. These states are particularly stored in the database 122, by the state machine 120, and thus by the state-tracking mechanism 118 and the connection broker 116. The state-tracking functionality of the connection broker 116 allows the services provided for by the connection broker 116 to be managed correctly in order to enable the virtualized hosted-client architecture.

Therefore, commands that a user like a network administrator or other IT personnel issues through the VM manager 102 to the connection broker 116 can include those that cause the sessions 114 to enter different states. Such commands may include a requested service, like the provisioning of a new session. Likewise, the connection broker 116 may itself make internal decisions that cause the sessions 114 to enter different states, which are referred to later in the detailed description as the connection broker 116 automatically causing a given transition. For example, if no session is both online and virtually powered up, the latter being the virtual equivalent to the turning of a physical computing device, then the connection broker 116 may itself decide that a session that is online but virtually powered down should transition to an state in which it is both online and virtually powered up.

Furthermore, the connection broker 116 is responsive to messages sent by connection-broker agents 124A, 124B, . . . , 124N, collectively referred to as the connection-broker agents 124, running on the guest OS's 106. The connection-broker agents 124 are software that monitor session-related events of their encompassing sessions 114 from the perspective of the OS's 106, and communicate them via messages, such as status-update messages. For instance, one type of such a message may indicate that the session in question is running particularly slow, which may mean that this session should be moved to a different VM.

The connection broker 116 is also responsive to messages sent by the thin-client computing devices 152 of FIG. 1 themselves, such as by the firmware of these computing devices 152. Such messages may include session-request messages. For example, an end or remote user at such a thin-client computing device may want to start running a session, such that this request is transferred via the thin-client computing device in question to the connection broker 116. It is further noted that the VMM 102, the connection broker 116, and the database 122 can in one embodiment be run on the same or different computer devices, which these computing devices themselves are the same or different computing devices as that on which the VM's 104 run.

Figure 3:
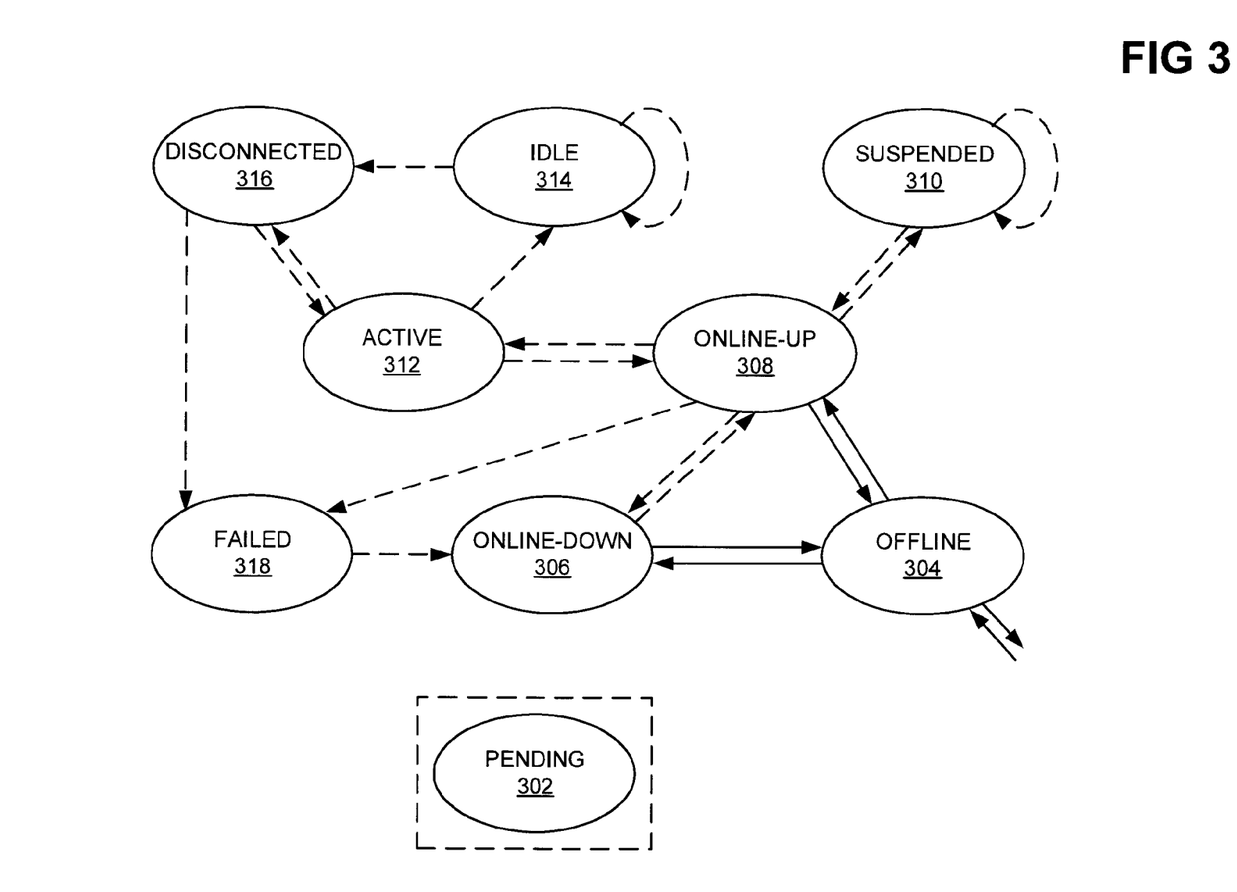
FIG. 3 is a state diagram of the states that a session can transition among, according to an embodiment of the invention.

FIG. 3 shows states 302, 304, 306, 308, 310, 312, 314, 316, and 318 that a session can transition among, according to an embodiment of the invention. A session transitions among the states as indicated by the arrows in FIG. 3. However, there is also a special, interim state, referred to as a pending state 302, which is denoted in FIG. 3 by a dotted-line box. The pending state 302 is the state that a session sometimes enters while transitioning between one of the other states and another of the other states. In particular, when state-to-state transitions are accomplished for a session that are denoted by dotted lines, then the pending state 302 is entered on an interim basis. This is because the transition requires some time, and therefore for accurate representation of the state that a session is currently in, the session is said to enter the pending state 302. The other state-to-state transitions, indicated by solid lines, are at least substantially immediate, such that the session in question does not enter the pending state 302 when making such a transition.

Therefore, the pending state 302 is a special state indicating that a state transition is in progress. While the transition is pending, the connection broker 116 maintains information about the initial "from" state and the requested "destination" state. When completion of the transition is detected, the current state is then updated as appropriate. In one embodiment, transition completion may be detected in one of two ways: asynchronous notification, and polling.

In asynchronous notification, completion of a transition is marked by the occurrence of an event that is detected and communicated to the connection broker 116 by an external component, like an agent. In polling, completion of a transition is not readily detected by an external component. For example, virtual powering-off of a VM through the VMM 102 can take some time to complete, and the connection-broker agent in question cannot detect that completion, since it will be no longer running upon successful powering-off. Therefore, the connection broker 116 simply monitors the state of the session in question.

In either case, when the state of a session is moved to the pending state 302 at the initiation of a transition, in one embodiment the current time is recorded, along with the starting and requested destination state. The connection broker 116 checks for completion after a prescribed time limit, and moves the session to the failed state 318 if the completion event has not been received, or entry into the destination state has not been detected. Thus, in one embodiment, all of the states 304, 306, 308, 310, 312, 314, and 316 can transition to the failed state 318, even though this is not particularly shown in FIG. 3.

With respect to the offline state 304, a session in this state is regarded by the connection broker 116 as being unavailable for allocation to users. Maintenance may be performed on an offline session, and the VM on which this session is running may be virtually powered-on or virtually powered-off. The session is thus known to the connection broker 116, but is not otherwise accessed until being brought online.

A session may be created an external management agent, such as the VMM 102 via the connection broker 116, with an appropriate command, and likewise be destroyed with an appropriate command. This is indicated by the solid-line arrows that point to and from the offline state 304, and from and to no other state. These commands may cause the connection broker 116 to provision and de-provision the session. Therefore, a newly provisioned session is created in the offline state 304 once provisioning is complete. Likewise, a newly de-provisioned session is destroyed.

As indicated in FIG. 3, an offline session may transition to the online-up state 308 or the online-down state 306, such as via an appropriate command. This command may be issued by the VMM 102, for instance. All transitions into or out of the offline state 304 are completed immediately, and do not enter the pending state 302.

With respect to the online-down state 306, a session in this state is virtually powered-down, but is available for allocation to end users once it is virtually powered-up. Powering up and powering down is virtual insofar as a real physical computer, or "machine," is not actually being powered up or powered down, but rather a session running on a VM is being powered up or powered down. An online-down session may be moved to the offline state 304 with an appropriate command, such as one being issued by the VMM 102, and such a transition is completed immediately, without interim entry into the pending state 302.

Alternatively, an online-down session may be moved to the online-up state either automatically, by the connection broker 116, or externally, such as via a command from the VMM 102, with an appropriate command. In such case, the transition is indicated as pending, and the pending state 302 is entered, until the guest OS in question has booted, and the associated connection-broker agent has notified the connection broker 116 that it is running. Failure of a command to start a session, however, results in the session remaining in the online-down state.

With respect to the online-up state 308, a session in this state is virtually powered-up and available for immediate allocation to users. An allocation may be requested by an appropriate message from a thin-client device, which initiates this transition to the active state 312. Such a transition is completed when an appropriate message is received indicating successful log-on from the connection-broker agent running on the OS in question. A failed log-on, however, causes the session to enter the failed state 318.

An online-up session may be moved to the offline state 304 immediately with an appropriate command, and this transition completes immediately. Alternatively, an online-up session may be returned to the online-down state 306 with a different command, or moved to the suspended state 310 with still another command. In either case, the connection broker 116 may have to poll to detect completion.

With respect to the suspended state 310, a session in this state is one that is running within a VM that has been suspended, such as to conserve resources or allow the session to be moved to another VM. The session in question by definition does not have a logged-in user, since a session with a logged-in user on a suspended VM is regarded as being in the idle state 314. A transition back to the online-up state 308 may be initiated automatically by the connection broker 116, or manually with an appropriate command issued by the VMM 102 or another agent. The connection broker 116 may have to poll to detect completion.

While in the suspended state 310, a session may be moved to another VM with an appropriate command being issued. In this case, too, the connection broker 116 may have to poll to detect completion. At the end of the transition, the session remains in the suspended state 310, however, in this case.

With respect to the active state 312, a session in this state is one that has been allocated to a user who has logged-on and is actively using the session. An active session returns to the online-up state 308 when the user logs off. This transition is not detected until the connection broker has received an appropriate message from the connection-broker agent running on the guest OS in question, indicating a log-off event. The transition is then completed immediately. Furthermore, a log-off may be forcibly initiated via an appropriate command, in which case the session is marked as being in the pending state 302 until a message has been received indicating completion.

Alternatively, the user may choose to disconnect from the session completely, rather than just log off. The transition is again detected when the connection broker 116 receives an appropriate message from the connection-broker agent and which indicates a disconnect event. Completion occurs immediately. A disconnect may be forcibly initiated with an appropriate command, from the VMM 102 or another agent, in which case the session enters the pending state 302 until an appropriate message from the connection-broker agent has been received.

Furthermore, it may be desirable to suspend the VM of an active session if the user has remained idle for a length of time. Such a suspension may be initiated by a message from the connection-broker agent indicating an idle-detect event. The connection broker 116 therefore in response disconnects the user and suspends the session, moving it to the idle state 314. Such a suspension may also be initiated with an appropriate command issued by the VMM 102 or another external agent. In either case, the connection broker 116 may have to poll to detect completion.

With respect to the idle state 314, a session in this state is one with a logged-on user and which is running within a VM that has been suspended. An idle session may be moved to the disconnected state 316 with an appropriate command issued by the VMM 102 or another agent. This transition may further be initiated automatically by the connection broker 116 upon receipt of an appropriate message from the connection-broker agent running on the OS of this VM, specifically from a user who already has a session in the idle state 314. In either case, the connection broker 116 may have to poll to detect completion.

While in the idle state 314, a session may be moved to another VM with issuance of an appropriate command by the VMM 102 or another agent. Again, the connection broker 116 may, however, have to poll to detect completion. At the end of the transition, the session remains in the idle state 314.

With respect to the disconnected state 316, a session in this state is associated with a user and has running processes, such as tasks or threads, as can be appreciated by those of ordinary skill within the art. However, a session in this state does not have a currently logged-on user. A disconnected session moves to the active state 312 when the user reconnects, such as by logging on again. The transition starts with a message being received from the thin-client computing device in question, and is completed when the connection broker receives a message from the connection-broker agent indicating that a log-on event has occurred.

Upon receipt of a message from the thin-client computing device, however, the connection broker 116 may first execute a port test, with failure resulting in an immediate transition to the failed state 318. A port test typically includes sending a network message to the target session and verifying that a reply has been received, indicating that the session is still responsive. Even if the port test succeeds, a message from the connection-broker agent indicating a successful log-on may nevertheless fail to arrive within a prescribed time limit, in which case the session is still moved to the failed state 318.

Finally, with respect to the failed state 318, a session is in this state upon some type of failure occurring. For example, as described in the preceding paragraph, the failure of a port test can cause failure, or the failure to receive a message indicating a successful log-on may not be received within the prescribed time limit. A failed session may be reclaimed by virtually powering-off the VM on which it is running, which causes the session to move to the online-down state 306. This transition can be initiated manually with the issuance of an appropriate command by the VMM 102 or another external agent, or automatically by the connection broker 116. In either case, the connection broker 116 may have to poll to detect completion.

Figure 4:
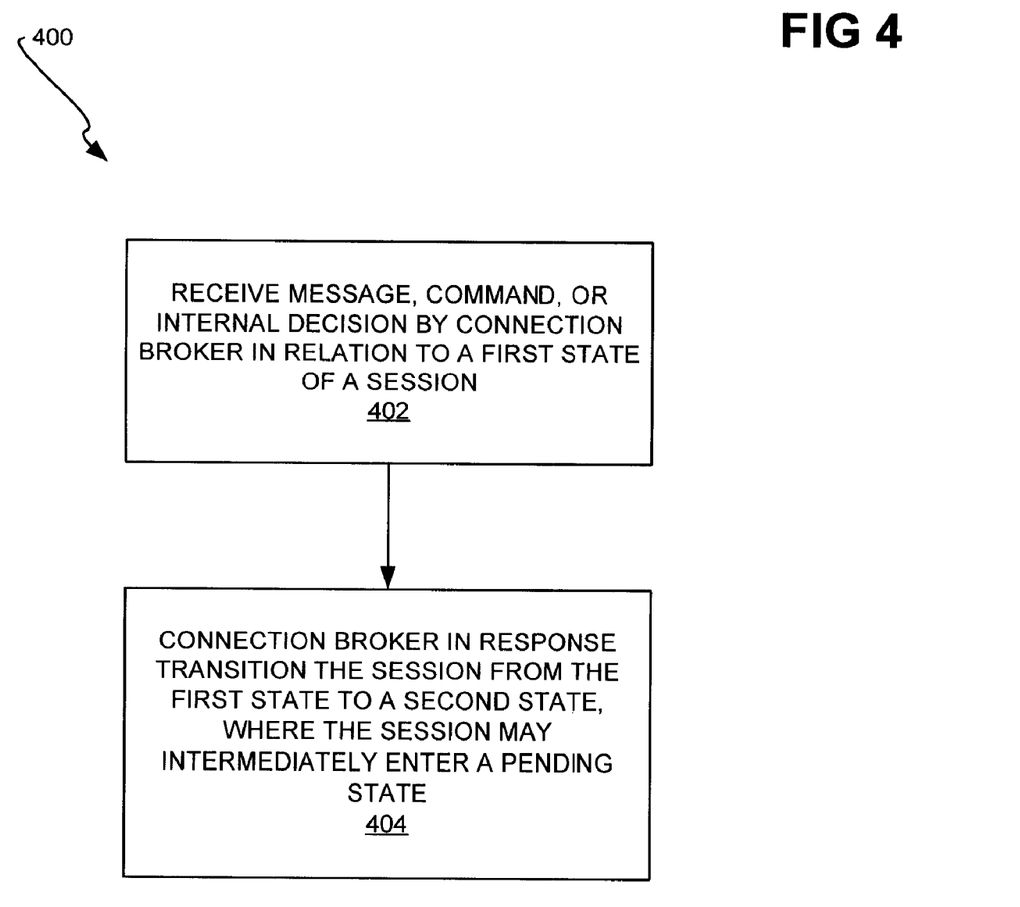
FIG. 4 is a flowchart of a method, according to an embodiment of the invention.

FIG. 4 shows a method 400 that summarizes the transitioning of a session from a first state to another state by the connection broker 116, according to an embodiment of the invention. The connection broker 116 first receives a message, command, or makes an internal decision, as to a session in a given first state (402). For instance, as has been described above, the message may be received from a thin-client computing device, or the connection-broker agent running on the guest OS of the session in question. As has also been described above, a command may be issued by the VMM 102, or by another external agent. The connection broker 116 may further make a decision itself as to the transition of a session between two states, which has been described above as the connection broker 116 automatically causing various transitions.

In response, the connection broker transitions the session to a second state (404), particular examples of such state-to-state transitioning having been already described in relation to FIG. 3. It is noted that some state-to-state transitions may result in the session first entering an intermediate, pending state 302 temporarily. Therefore, the connection broker 116 is able to detect even when a given session is in-between states, since such a session will first be in the pending state 302 before it enters the desired second state from its original first state.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
   receiving a message, command, or an internal decision by a connection broker implemented at least in hardware in relation to a first state of a session encompassing a guest operating system (OS) hosted by a virtual machine (VM) environment and one or more application programs capable of running on the guest OS, the VM environment implemented at least in hardware; and,
   the connection broker in response transitioning the session from the first state to a second state, the first state and the second state selected from a plurality of states consisting of: an offline state, an online-down state, an online-up state, a suspended state, an active state, an idle state, a disconnected state, and a failed state, wherein during transition from the first state to the second state, the session is within an interim, pending state,
   wherein the offline state indicates that a session is unavailable for allocation, the online-down state and the online-up state directly transitionable to the offline state without having to pass through any intervening state, the offline state directly transitionable to the online-down state and the online-up state without having to pass through any intervening state, and when the session is initially added or created, the offline state is exited upon removal or destruction of the session,
   wherein the online-down state indicates that a session is virtually powered down but available for allocation, the offline state, the online-up state, and the failed state directly transitionable to the online-down state without having to pass through any intervening state, and the online-down state directly transitionable to the offline state and the online-up state without having to pass through any intervening state, and
   wherein the online-up state indicates that a session is virtually powered up and available for allocation, the offline state, the online-down state, and the suspended state directly transitionable to the online-up state without having to pass through any intervening state, and the online-up state directly transitionable to the offline state, the online-down state, the suspended state, and the failed state without having to pass through any intervening state.

2. The method of claim 1, further comprising storing the states of the session within a database.

3. The method of claim 1, further comprising receiving output by one or more thin-client computing devices from the VM environment.

4. The method of claim 1, further comprising sending messages by one or more connection-broker agents running on the guest OS to the connection broker.

5. The method of claim 1, further comprising managing the VM environment by an external management agent.

6. The method of claim 1, wherein the suspended state indicates that a session is running within the VM environments has been suspended, and that the session has not been allocated, the online-up state and the suspended state directly transitionable to the suspended state without having to pass through any intervening state, and the suspended state directly transitionable to the online-up state and to itself without having to pass through any intervening state.

7. The method of claim 1, wherein the active state indicates that a session has been allocated to a user who has logged onto the guest OS of the session and is actively using the session, the online-up state and the disconnected state directly transitionable to the active state without having to pass through any intervening state, and the active state directly transitionable to the online-up state, the idle state, and the disconnected state without having to pass through any intervening state.

8. The method of claim 1, wherein the idle state indicates that a session has been allocated to a user who has logged onto the guest OS of the session but is running within the VM environment that has been suspended, the active state and the idle state directly transitionable to the idle state without having to pass through any intervening state, and the idle state directly transitionable to the disconnected state and to itself without having to pass through any intervening state.

9. The method of claim 1, wherein the disconnected state indicates that a session has been allocated to a user and is running, but the user is not currently logged onto the guest OS of the session, the active state and the idle state directly transitionable to the disconnected state directly without having to pass through any intervening state, and the disconnected state directly transitionable to the active state and the failed state without having to pass through any intervening state.

10. The method of claim 1, wherein the failed state indicates that a session has failed, the online-up state and the disconnected state directly transitionable to the failed state without having to pass through any intervening state, and the failed state directly transitionable to the online-down state without having to pass through any intervening state.

11. A non-transitory computer-readable data storage medium having a computer program stored thereon, where execution of the computer program by a connection broker implemented at least in hardware causes a method to be performed, the method comprising:
    receiving a message, command, or an internal decision in relation to a first state of a session encompassing a guest operating system (OS) hosted by a virtual machine (VM) environment and one or more application programs capable of running on the guest OS, the VM environment implemented at least in hardware; and,
    in response transitioning the session from the first state to a second state, the first state and the second state selected from a plurality of states consisting of: an offline state, an online-down state, an online-up state, a suspended state, an active state, an idle state, a disconnected state, and a failed state, wherein during transition from the first state to the second state, the session is within an interim, pending state,
    wherein the offline state indicates that a session is unavailable for allocation, the online-down state and the online-up state directly transitionable to the offline state without having to pass through any intervening state, the offline state directly transitionable to the online-down state and the online-up state without having to pass through any intervening state, and when the session is initially added or created, the offline state is exited upon removal or destruction of the session,
    wherein the online-down state indicates that a session is virtually powered down but available for allocation, the offline state, the online-up state, and the failed state directly transitionable to the online-down state without having to pass through any intervening state, and the online-down state directly transitionable to the offline state and the online-up state without having to pass through any intervening state, and wherein the online-up state indicates that a session is virtually powered up and available for allocation, the offline state, the online-down state, and the suspended state directly transitionable to the online-up state without having to pass through any intervening state, and the online-up state directly transitionable to the offline state, the online-down state, the suspended state, and the failed state without having to pass through any intervening state.

12. The non-transitory computer-readable data storage medium of claim 11, wherein the method further comprises storing the states of the session within a database.

13. The non-transitory computer-readable data storage medium of claim 11, wherein the suspended state indicates that a session is running within the VM environments has been suspended, and that the session has not been allocated, the online-up state and the suspended state directly transitionable to the suspended state without having to pass through any intervening state, and the suspended state directly transitionable to the online-up state and to itself without having to pass through any intervening state.

14. The non-transitory computer-readable data storage medium of claim 11, wherein the active state indicates that a session has been allocated to a user who has logged onto the guest OS of the session and is actively using the session, the online-up state and the disconnected state directly transitionable to the active state without having to pass through any intervening state, and the active state directly transitionable to the online-up state, the idle state, and the disconnected state without having to pass through any intervening state.

15. The non-transitory computer-readable data storage medium of claim 11, wherein the idle state indicates that a session has been allocated to a user who has logged onto the guest OS of the session but is running within the VM environment that has been suspended, the active state and the idle state directly transitionable to the idle state without having to pass through any intervening state, and the idle state directly transitionable to the disconnected state and to itself without having to pass through any intervening state.

16. The non-transitory computer-readable data storage medium of claim 11, wherein the disconnected state indicates that a session has been allocated to a user and is running, but the user is not currently logged onto the guest OS of the session, the active state and the idle state directly transitionable to the disconnected state directly without having to pass through any intervening state, and the disconnected state directly transitionable to the active state and the failed state without having to pass through any intervening state.

17. The non-transitory computer-readable data storage medium of claim 11, wherein the failed state indicates that a session has failed, the online-up state and the disconnected state directly transitionable to the failed state without having to pass through any intervening state, and the failed state directly transitionable to the online-down state without having to pass through any intervening state.

* * * * *